United States Patent Office 2,872,375
Patented Feb. 3, 1959

2,872,375
STABILIZED PENICILLIN SALTS

Gustavo A. Weitnauer, Guido Gioia, and Arrigo Caporali, Torre Annunziata, Naples, Italy, assignors to Lepetit S. p. A., Milan, Italy No Drawing. Application March 14, 1956
Serial No. 571,372

Claims priority, application Italy March 21, 1955

9 Claims. (Cl. 167—65)

This invention relates to stabilized penicillin salts.

More particularly the invention relates to new dry penicillin salt preparations wherein penicillin salts are associated with a stabilizing agent, whereby deterioration of penicillin salts is prevented over long periods of time.

It is known that penicillin salts, particularly the potassium and sodium salts, undergo a progressive deterioration with discoloration and loss of potency. Therefore an expiration date is established by law in all countries where penicillin salts are marketed.

The deterioration of penicillin salts in containers and vials becomes apparent by a clustering of the crystals and by the adhesion of the product to the walls and to the bottom of containers, by a yellowish color of the product and by a loss of potency.

The decomposition rate of penicillin salts is dependent upon their purity grade and the addition of buffering agents, such as sodium citrate. Also the temperature of storage is very important; however, the moisture which the product may absorb with aging is the most important cause of decomposition. In fact, when moisture is totally excluded and the penicillin salts are stored in the dry state in a sealed ampule, decomposition is practically negligible even after very prolonged storage at room or slightly raised temperature (for example at 40° to 60° C.).

One of the problems in the distribution and administration of penicillin salts is therefore the deterioration of said salts in containers commonly used for marketing antibiotic substances. This deterioration is particularly rapid when the containers are stored over a prolonged period of time in warm and moist rooms, and in tropical countries.

Attempts have been made to solve the problem by appropriately modifying the containers, stoppers and metal caps in order to carefully prevent atmospheric moisture from coming in contact with the penicillin salts. However, these modifications failed to give satisfactory results. No appreciable advantages were obtained even by covering the top of containers with waxes, varnishes and natural or synthetic resins.

We have now found that the deterioration and discoloration of penicillin salts in containers commonly used for antibiotic substances can be practically prevented by adding to penicillin salts a plurality of stabilizing agents which absorb moisture at a higher rate than penicillin salts do.

The improved products in accordance with our invention comprise an intimate mixture of at least one penicillin salt with about 0.5 to 5% of at least one alkaline earth metal chloride as stabilizing agent. Typical substances which are particularly effective in preventing deterioration of penicillin salts are, for instance, calcium chloride and magnesium chloride; however, barium chloride may also be used with very satisfactory results.

It is not critical that the stabilizing agents be present in the anhydrous form, as they can be used also in partially hydrated form. However, a totally anhydrous product is in all cases preferable, in order to increase the water-absorbing power of the mixture.

The improved mixtures of our invention considerably prolong the life of penicillin preparations under unfavorable temperature and moisture conditions. Although tests could not be carried out for a sufficient number of years to ascertain after how many years our products decompose under ordinary temperature and air moisture conditions, nevertheless experiments performed under tropical conditions and at artificially raised temperatures adequately show the utility of the mixtures. The obtained results are shown in the appended examples.

Other hygroscopic substances have been tested for their ability to prevent the deterioration and discoloration of penicillin salts; however, the results obtained are not comparable with those obtained with alkaline earth metal chlorides. In any case, either the increase in stability of the mixtures was too poor, not exceeding about 20–30% of stability of the salts without additives, or the mixtures showed physical incompatibilities. Of some utility were, however, the following substances: lithium chloride, lithium citrate, alkali metal formates, alkali metal acetates, alkali metal camphorates, potassium bisulfite, sodium sulfate, potassium thiosulfate, sodium phosphite, sodium metaphosphate, alkali metal borates, sodium pyrophosphate.

The new mixtures of penicillin salts with alkaline earth metal chlorides may be obviously admixed with other antibiotic or different physiologically active or inert substances. Surface active substances, such as Tween 80, or thickening agents, such as carboxymethylcellulose, or anti-foaming agents, such as silicones, may also be added without substantially decreasing the stability of the mixtures.

The following examples indicate typical compositions of our new stabilized penicillin salt preparations in accordance with our invention. However, it is to be understood that the examples are given by way of illustration only and not of limitation.

EXAMPLE 1

One hundred grams of dried sodium penicillin are thoroughly admixed, under conditions of low moisture, with 5 g. of practically anhydrous calcium chloride. The mixture is distributed into vials.

Representative samples of these vials were stored at different temperatures and for different periods of time. Assays of penicillin potency carried out at various regular intervals gave the results summarized in the following tables.

The potencies are expressed in international units; the starting potency was 100,000 U. Average values of 10 vials are recorded.

*Temperature 60° C.*

| Period of storage | 0 | 1 week | 2 weeks | 3 weeks | 4 weeks |
|---|---|---|---|---|---|
| Na penicillin with $CaCl_2$ | 100,000 | 100,000 | 99,600 | 99,600 | 99,500 |

*Temperature 45° C.*

| Period of storage | 0 | 2 weeks | 4 weeks | 6 weeks | 10 weeks |
|---|---|---|---|---|---|
| Na penicillin with $CaCl_2$ | 100,000 | 100,000 | 100,000 | 99,400 | 99,300 |

*Temperature 30° C.*

| Period of storage | 0 | 1 month | 2 months | 3 months | 4 months |
|---|---|---|---|---|---|
| Na penicillin with $CaCl_2$ | 100,000 | 100,000 | 100,000 | 100,000 | 98,800 |

At ordinary temperature, no appreciable decrease in potency of the mixture was observed after 2 years.

After 3 weeks at 60°, the mixture showed no change of its white color. The control samples, on the contrary, were yellow colored. Also the appearance of the crystalline powder was quite different, since our improved mixture was unaltered, while the control samples adhered to the walls and bottom of the vials and were agglomerated into clumps.

When stored under the same temperature conditions as above described, sodium penicillin vials showed a practically complete loss of potency after 3 weeks at 60°, 2 months at 45° and 6 months at 30°. In any case, after short periods of time the sodium penicillin was of dark yellow to brown color.

EXAMPLE 2

A mixture is prepared by thoroughly admixing the following ingredients:

| | G. |
|---|---|
| Potassium penicillin, finely ground | 100 |
| Anhydrous magnesium chloride | 0.5 |

The mixture is distributed into containers in 1.0 g. portions. The containers are stoppered and stored.

No significant potency loss was observed after 3 weeks' storage at 60° C., as well as after 3 months at 30° C. and 1 year at room temperature. After these periods the mixture was perfectly white. The control samples were partially decomposed and yellow colored under analogous condition.

EXAMPLE 3

A mixture is prepared containing:

| | G. |
|---|---|
| Potassium penicillin, finely ground | 100 |
| Procaine penicillin, finely ground | 230 |
| Streptomycin | 190 |
| Anhydrous calcium chloride | 2.5 |
| Anhydrous magnesium chloride | 2.5 |
| Tween 80 | 0.05 |
| Carboxymethylcellulose | 0.25 |

The mixture is distributed into containers. The potency tests performed at different intervals gave about the same results as indicated in Example 2.

EXAMPLE 4

A mixture is prepared by thoroughly admixing the following substances:

| | G. |
|---|---|
| Potassium penicillin, finely ground | 100 |
| Procaine penicillin, finely ground | 318 |
| N,N'-dibenzylethylenediamine dipenicillin, finely ground | 368 |
| Anhydrous calcium chloride | 2.5 |
| Anhydrous barium chloride | 2.5 |

The mixture is distributed into vials by the usual procedures. No change in potency is observed after 3 weeks at 50° C.

EXAMPLE 5

A mixture is prepared by admixing the following ingredients:

| | G. |
|---|---|
| Sodium penicillin, finely ground | 100 |
| Anhydrous calcium chloride | 5 |
| Carboxymethylcellulose | 0.05 |

The mixture, when distributed into containers, showed no significant change in potency and color after 1 year storage at 25° C.

EXAMPLE 6

| | G. |
|---|---|
| Potassium penicillin, finely ground | 100 |
| Procaine penicillin, finely ground | 240 |
| Streptomycin sulfate | 255 |
| Dihydrostreptomycin sulfate | 255 |
| Anhydrous magnesium chloride | 1.5 |

The powders are thoroughly admixed and distributed into vials. After 2 months storage at 40° C. they showed no significant change in potency and color.

What we claim is:

1. Penicillin salt compositions stabilized against deterioration and discoloration, which comprise an intimate mixture of penicillin salts with about 0.5 to 5% of at least one anhydrous alkaline earth metal chloride.

2. Penicillin salt compositions stabilized against deterioration and discoloration, which comprise an intimate mixture of at least one penicillin salt with about 0.5 to 5% of at least one anhydrous alkaline earth metal chloride.

3. Penicillin salt compositions stabilized against deterioration and discoloration, which comprise an intimate mixture of at least one penicillin salt selected from the group consisting of an alkali metal salt of penicillin and an organic base salt of penicillin with about 0.5 to 5% of at least one anhydrous alkaline earth chloride.

4. A penicillin salt composition stabilized against deterioration and discoloration, which comprises an intimate mixture of sodium penicillin with 0.5 to 5% of anhydrous calcium chloride.

5. A penicillin salt composition stabilized against deterioration and discoloration, which comprises an intimate mixture of potassium penicillin and procaine penicillin with 0.5 to 5% of a mixture of anhydrous calcium chloride and magnesium chloride.

6. A penicillin salt composition stabilized against deterioration and discoloration, which comprises an intimate mixture of potassium penicillin, procaine penicillin and N,N'-dibenzylethylenediamine penicillin, with 0.5 to 5% of a mixture of anhydrous calcium chloride and anhydrous barium chloride.

7. A penicillin salt composition stabilized against deterioration and discoloration, which comprises an intimate mixture of sodium penicillin with 0.5 to 5% of anhydrous magnesium chloride.

8. Penicillin salt compositions stabilized against deterioration and discoloration, which comprise an intimate mixture of a penicillin salt with about 5% of at least one anhydrous alkaline earth metal chloride.

9. A penicillin salt composition stabilized against deterioration and discoloration, which comprises an intimate mixture of sodium penicillin with about 5% of anhydrous calcium chloride.

References Cited in the file of this patent

UNITED STATES PATENTS

| 2,530,372 | Bohls | Nov. 21, 1950 |
| 2,533,065 | Taplin | Dec. 5, 1950 |
| 2,619,447 | Malcolm | Nov. 25, 1952 |

OTHER REFERENCES

Abraham et al.: The lancet, Aug. 16, 1941, pp. 177–188.